(12) United States Patent
Huang et al.

(10) Patent No.: US 11,703,424 B2
(45) Date of Patent: Jul. 18, 2023

(54) SYSTEM AND METHOD FOR TRAINING ANOMALY DETECTION ANALYTICS TO AUTOMATICALLY REMOVE OUTLIER DATA

(71) Applicant: General Electric Company, Schenectady, NY (US)

(72) Inventors: Dayu Huang, Rexford, NY (US); Frederick Wilson Wheeler, Niskayuna, NY (US); John Joseph Mihok, Schenectady, NY (US); David C. Korim, Albany, NY (US)

(73) Assignee: General Electric Company, Schenectady, NY (US)

( * ) Notice: Subject to any disclaimer, the term of this patent is extended or adjusted under 35 U.S.C. 154(b) by 480 days.

(21) Appl. No.: 16/879,828

(22) Filed: May 21, 2020

(65) Prior Publication Data

US 2021/0364392 A1 Nov. 25, 2021

(51) Int. Cl.
*G01M 99/00* (2011.01)
*G06N 20/00* (2019.01)
(Continued)

(52) U.S. Cl.
CPC ....... *G01M 99/005* (2013.01); *G06F 11/0748* (2013.01); *G06F 17/10* (2013.01);
(Continued)

(58) Field of Classification Search
CPC ...... G06F 11/0748; G06F 17/10; G06F 30/27; G06N 5/04; G06N 20/00; G06N 7/005;
(Continued)

(56) References Cited

U.S. PATENT DOCUMENTS

| 2012/0185180 | A1 | 7/2012 | Frederiksen |
| 2013/0124147 | A1 | 5/2013 | Jin et al. |

(Continued)

FOREIGN PATENT DOCUMENTS

| CN | 108534756 | A |  | 9/2018 |  |
| GB | 2585106 | A | * | 12/2020 | ............. F03B 15/00 |

OTHER PUBLICATIONS

Kaspi O, Yosipof A, Senderowitz H. RANdom SAmple Consensus (RANSAC) algorithm for material-informatics: application to photovoltaic solar cells. J Cheminform. Jun. 6, 2017;9(1):34. doi: 10.1186/s13321-017-0224-0. PMID: 29086047; PMCID: PMC5461245. (pp. 1-15) (Year: 2017).*

(Continued)

*Primary Examiner* — Joseph P Hirl
*Assistant Examiner* — Thomas A Gyorfi
(74) *Attorney, Agent, or Firm* — Dority & Manning, P.A.

(57) ABSTRACT

A method for detecting anomalies during operation of an asset to improve performance of the asset includes collecting, via a server, data relating to operation of the asset or a group of assets containing the asset. The data includes normal and abnormal asset behavior of the asset or the group of assets containing the asset. Further, the method includes automatically removing, via an iterative algorithm programmed in the server that utilizes one or more inputs or outputs of an anomaly detection analytic, portions of the data containing the abnormal asset behavior to form a dataset containing only the normal asset behavior. The method also includes training, via a computer-based model programmed in the server, the anomaly detection analytic using, at least, the dataset containing only the normal asset behavior. Moreover, the method includes applying, via the server, the anomaly detection analytic to the asset so as to monitor for anomalies during operation thereof.

16 Claims, 6 Drawing Sheets

(51) Int. Cl.
  *G06N 5/04*   (2023.01)
  *G06F 11/07*  (2006.01)
  *G06F 17/10*  (2006.01)
  *H04L 9/40*   (2022.01)

(52) U.S. Cl.
  CPC .............. *G06N 5/04* (2013.01); *G06N 20/00* (2019.01); *H04L 63/1425* (2013.01)

(58) Field of Classification Search
  CPC .............. H04L 63/1425; G01M 99/005; F05B 2260/80; F03D 7/048; G06K 9/6256; Y02E 10/72
  See application file for complete search history.

(56) References Cited

U.S. PATENT DOCUMENTS

2019/0188584 A1*  6/2019  Rao ................... G05B 19/4184
2019/0236456 A1*  8/2019  Kim ....................... H02S 50/00

OTHER PUBLICATIONS

Fischler et al., Random Sample Consensus: A Paradigm for Model Fitting with Applications to Image Analysis and Automated Cartography, Communications of the ACM, vol. 24, No. 6, Jun. 1981. Abstract Only https://doi.org/10.1145/358669.358692.
Huang et al., On Label Noise Problem for Anomaly Detection and a Farm Consensus Solution, 8 Pages.
Huang, SBM for GearBox Temperature, 10 Pages.
Ni et al., GroupSAC: Efficient Consensus in the Presence of Groupings, 2009 IEEE 12th International Conference on Computer Vision (ICCV), pp. 2193-2200.
Wegerich, Similarity-based Modeling of Vibration Features for Fault Detection and Identification, Sensor Review, vol. 25, No. 2, 2005, pp. 114-122. Abstract Only.
European Search Report for EP Application No. 21173505,5, dated Oct. 26, 2021.
Anonymous, Random Sample Consensus, Wikipedia, Apr. 30, 2020, retrieved from the internet on Oct. 8, 2021, from URL https://en.wikipedia.org/w/index.php?title=Random_sample_consensus&oldid=954083662, pp. 1-3.

* cited by examiner

SYSTEM AND METHOD FOR TRAINING ANOMALY DETECTION ANALYTICS TO AUTOMATICALLY REMOVE OUTLIER DATA

FIELD

The present disclosure relates generally to wind farms and, more particularly, to systems and methods for training anomaly detection analytics for one or more wind farm assets such that outlier data corresponding to abnormal asset behavior is automatically detected and excluded.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The rotor blades capture kinetic energy of wind using known airfoil principles. For example, rotor blades typically have the cross-sectional profile of an airfoil such that, during operation, air flows over the blade producing a pressure difference between the sides. Consequently, a lift force, which is directed from a pressure side towards a suction side, acts on the blade. The lift force generates torque on the main rotor shaft, which is geared to a generator for producing electricity.

A plurality of wind turbines are commonly used in conjunction with one another to generate electricity and are commonly referred to as a "wind farm." During operation, it is advantageous to utilize various analytics to evaluate wind turbine and/or wind farm performance to ensure that the wind turbine(s) and/or wind farm are operating properly. Many analytics are trained on multi-parameter time-series data for an asset or group of assets and are then applied to an asset. Such analytics may include, for example, anomaly detection analytics that utilize various machine learning methods for identifying abnormal operation of the wind turbine(s) in the wind farm.

However, existing anomaly detection analytics have certain disadvantages. For example, existing anomaly detection analytics assume the underlying historical data used to train the detector(s) corresponds to healthy operation of the asset or assets (i.e. the wind turbine(s) and/or its various components) and thus exhibits normal data variation. Unfortunately, however, this assumption is not always accurate. Rather, in many instances, when anomaly detection analytics are trained, an asset or assets are not healthy or intermittently not healthy. Thus, the data may contain outliers that do not correspond to normal data variation.

Some anomaly detection analytics are robust and still work well when the training data contains outliers. However, other anomaly detection analytics are not robust, and even small amounts of outlier training data can cause poor performance. For example, some anomaly detection analytics require the training data to all be from healthy assets and therefore are not robust to training data contaminated with data samples from an asset in an unhealthy state. Thus, to apply these anomaly detection analytics, the data must be manually filtered or selected first, or the training data must be filtered using certain criterion based on asset properties, or an outlier rejection algorithm must be created for the anomaly detection analytic, which might require customization for each anomaly detection analytic.

In view of the foregoing, the art is continuously new and improved systems and methods for improving existing anomaly detection analytics. Accordingly, the present disclosure is directed to system and methods for training existing anomaly detection analytics on time-series data for one or more assets such that outlier data corresponding to intermittent abnormal asset behavior is automatically detected and excluded.

BRIEF DESCRIPTION

Aspects and advantages of the invention will be set forth in part in the following description, or may be obvious from the description, or may be learned through practice of the invention.

In one aspect, the present disclosure is directed to a method for detecting anomalies during operation of an asset to improve performance of the asset. The method includes collecting, via a server, data relating to operation of the asset or a group of assets containing the asset. The data includes normal and abnormal asset behavior of the asset or the group of assets containing the asset. Further, the method includes automatically removing, via an iterative algorithm programmed in the server that utilizes one or more inputs or outputs of an anomaly detection analytic, portions of the data containing the abnormal asset behavior to form a dataset containing only the normal asset behavior. The method also includes training, via a computer-based model programmed in the server, the anomaly detection analytic using, at least, the dataset containing only the normal asset behavior. Moreover, the method includes applying, via the server, the anomaly detection analytic to the asset so as to monitor for anomalies during operation thereof.

In an embodiment, each asset in the group of assets may have operational data that follows similar normal data variation patterns when the assets are healthy. For example, in an embodiment, the plurality of similar assets may be a plurality of wind turbines in a wind farm, a plurality of solar panels in a solar farm, a plurality of energy storage systems, or combinations thereof.

In another embodiment, the iterative algorithm may include a random sample consensus algorithm. In such embodiments, automatically removing, via the random sample consensus algorithm programmed in the server, the portions of the data containing the abnormal asset behavior to form the dataset containing only the normal asset behavior may include (a) randomly sampling the data relating to operation of the asset or the group of assets containing the asset, (b) training a model of the anomaly detection analytic using the sampled data, (c) evaluating the model using unsampled portions of the data, (d) counting a number of inliers within the evaluated model, the inliers corresponding to data points confirming to the model, (e) repeating (a) through (d) until the inliers within the model exceed a certain threshold, and (f) outputting a trained dataset to the at least one anomaly detection analytic when the inliers within the model exceed the certain threshold, the trained dataset containing only data representative of the normal asset behavior.

In yet another embodiment, the random sample consensus algorithm may include a group-based random sample consensus algorithm. In such embodiments, automatically removing, via the group-based random sample consensus algorithm programmed in the server, the portions of the data containing the abnormal asset behavior to form the dataset containing only the normal asset behavior may include (a) dividing the data relating to operation of the asset or the group of assets into multiple subsets, (b) randomly sampling a collection of the multiple subsets, (c) training a model of the anomaly detection analytic using the sampled collection of the multiple subsets, (d) evaluating the model using the data outside of the collection, (e) counting a number of inliers within the evaluated model, the inliers corresponding to data points conforming to the model, or alternatively counting the number of subsets that the inliers belong to, (f) repeating (b) through (e) until the number of inliers within the model or the number of subsets that the inliers belong to exceed a certain threshold, and (g) outputting a trained dataset to the at least one anomaly detection analytic when the inliers within the model exceed the certain threshold, the trained dataset containing only data representative of the normal asset behavior.

In additional embodiments, dividing the data into the multiple subsets may be determined based on which assets the data are collected from, where each subset contains data from one asset, or multiple assets grouped by a distance between assets, closeness of installation date, configuration of the assets, service or operating history of the assets, or operating states of the assets.

In further embodiments, the data relating to operation of the asset or the group of assets containing the asset may include time-series data.

In several embodiments, the method may include training the at least one anomaly detection analytic using the generated dataset containing only the normal asset behavior and historical data.

In several embodiments, the anomaly detection analytic(s) may include at least one of a similarity-based modeling (SBM) based anomaly detection analytic. In yet another embodiment, the computer-based model may include at least one of a machine learning algorithm or a statistical model.

In another aspect, the present disclosure is directed to a system for improving performance of at least one asset. The system includes at least one analytic for receiving an analytic input and generating an analytic output relating to operation of the asset or a group of assets containing the asset and a server communicatively coupled to the at least one analytic. The server is configured to perform a plurality of operations, including but not limited to collecting data relating to operation of the asset or the group of assets containing the asset, the data comprising normal and possibly abnormal asset behavior of the asset or the group of assets containing the asset, automatically removing, via an iterative algorithm programmed in the server that utilizes one or more of the analytic input or analytic output, portions of the data containing the abnormal asset behavior to form a dataset containing only the normal asset behavior, training, via a computer-based model programmed in the server, the at least one analytic using, at least, the dataset containing only the normal asset behavior, and applying, via the server, the analytic to the asset to improve the performance of the asset.

In an embodiment, the asset(s) may include at least one wind turbine, a solar panel, an energy storage system, or combinations thereof. In yet another embodiment, the analytic may be an anomaly detection analytic. It should be understood that the system may include any one or more of the additional features described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to systems and methods for training anomaly detection analytics for one or more wind farm assets such that outlier data corresponding to abnormal asset behavior is automatically detected and excluded. Excluding outlier data during training of anomaly detection analytics improves the performance of the detectors during application. In addition, automatically detecting and removing outlier data eliminates the need for a time-consuming manual outlier removal process. The systems and methods of the present disclosure can be used with any existing anomaly detection analytic, though such systems and methods can be especially beneficial for existing anomaly detection analytics that are not inherently robust to outlier data.

Existing anomaly detection analytics are trained on historical data for an asset or assets to learn normal data variation patterns. Most anomaly detection analytics use machine learning or statistical models internally. A trained anomaly detection analytic is then applied to new data for an asset and detects when the data is no longer following normal data variation patterns. This is useful for detecting non-specific mechanical, operational or performance problems with the asset. Thus, a benefit of the present disclosure is that when coupled with an existing non-robust anomaly detection analytic, it makes the existing anomaly detection analytic robust to outlier training data. The outlier training data is automatically detected and removed from the training process. The anomaly detection analytic is then trained on data that corresponds to a healthy asset state and thus learns normal data variation patterns corresponding to that state.

Figure 1:
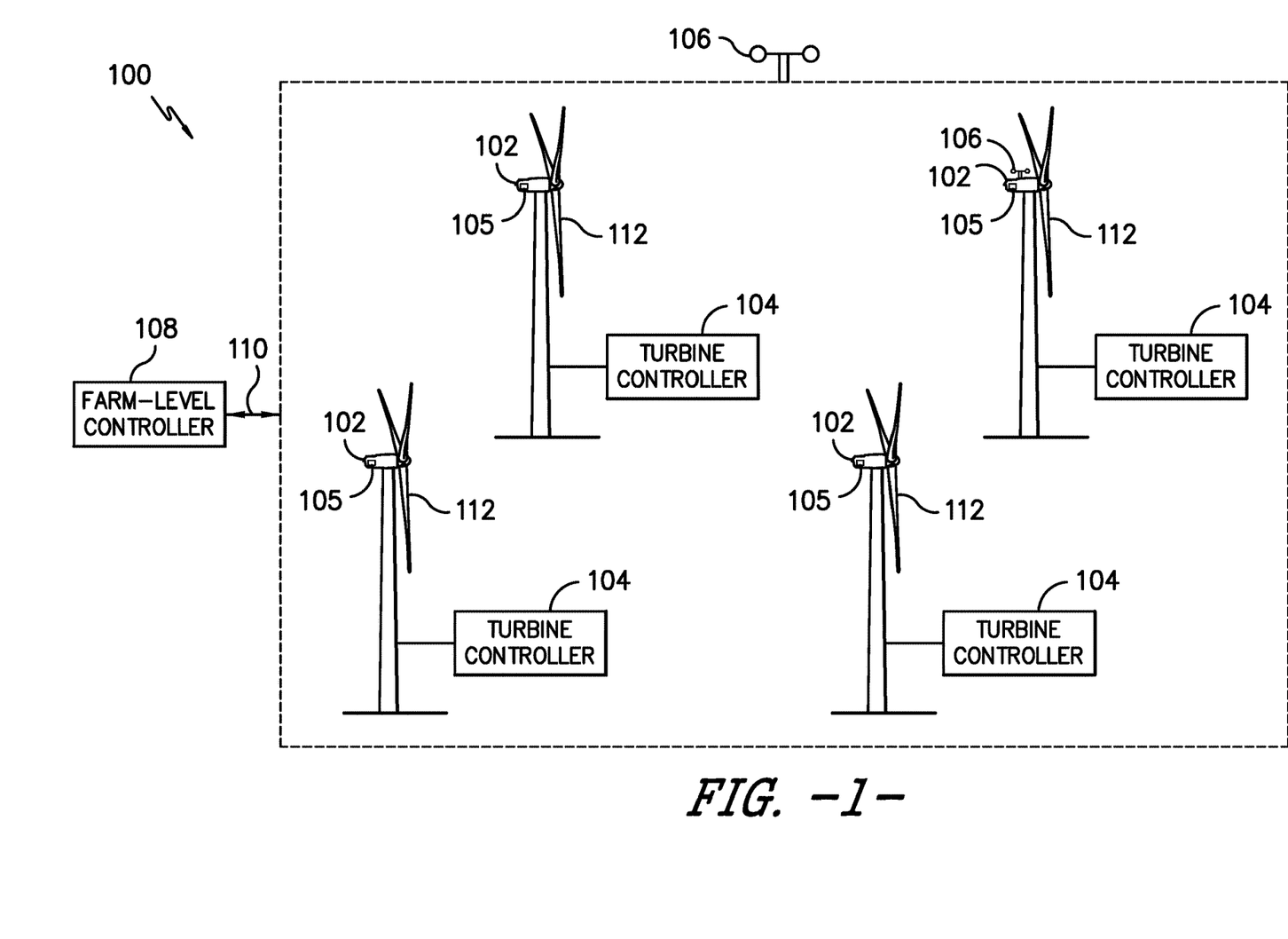
FIG. 1 illustrates a perspective view of one embodiment of a wind farm according to the present disclosure.

Referring now to the drawings, FIG. 1 illustrates an exemplary embodiment of a wind farm 100 containing a plurality of wind turbines 102 according to aspects of the present disclosure. The wind turbines 102 may be arranged in any suitable fashion. By way of example, the wind turbines 102 may be arranged in an array of rows and columns, in a single row, or in a random arrangement. Further, FIG. 1 illustrates an example layout of one embodiment of the wind farm 100. Typically, wind turbine arrangement in a wind farm is determined based on numerous optimization algorithms such that AEP is maximized for corresponding site wind climate. It should be understood that any wind turbine arrangement may be implemented, such as on uneven land, without departing from the scope of the present disclosure. Further, while there are benefits to applying the method to turbines from one farms, the method may also be applied to a group of turbines from several farms.

Figure 2:
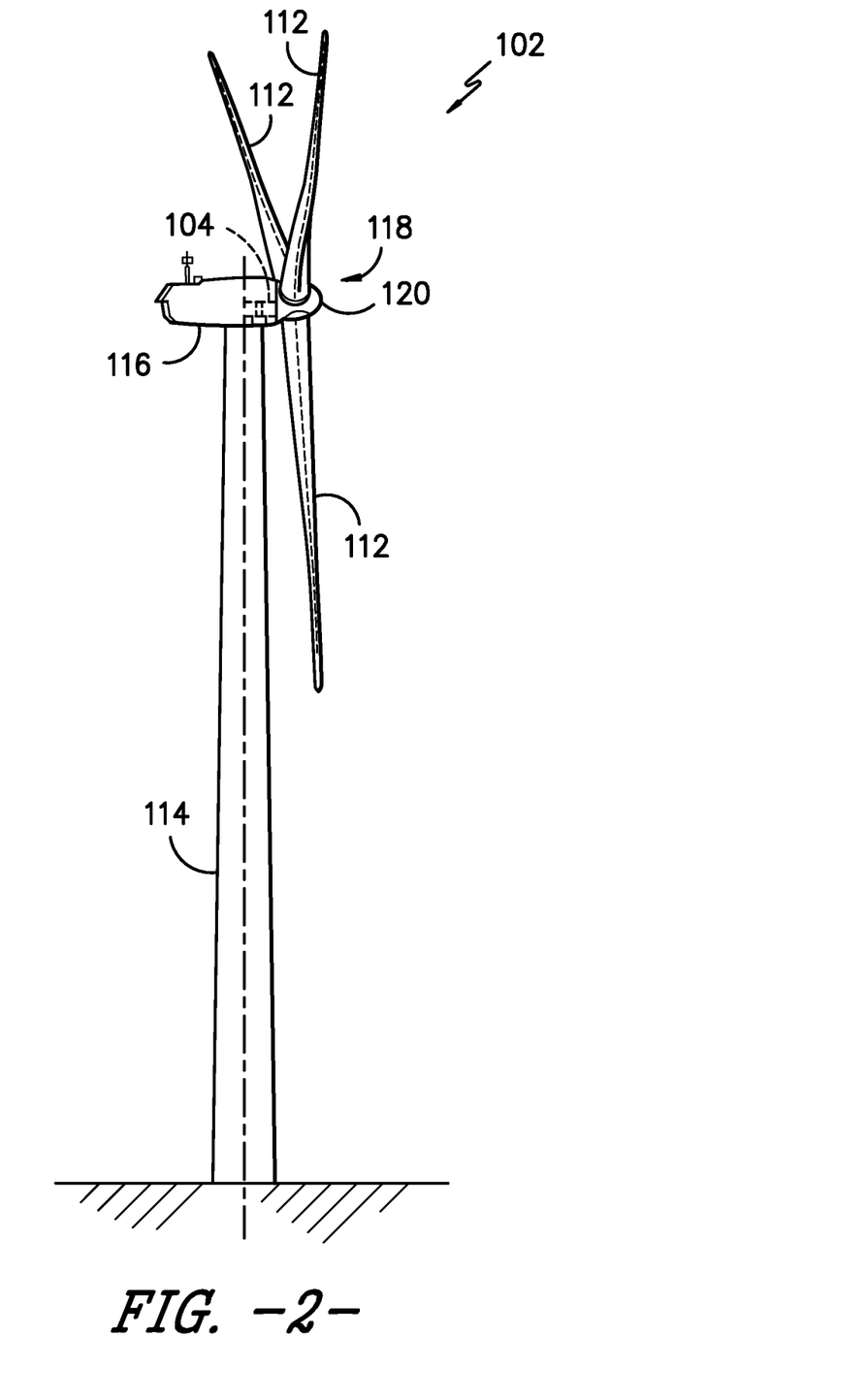
FIG. 2 illustrates a perspective view of one embodiment of a wind turbine according to the present disclosure.

In addition, it should be understood that the wind turbines 102 of the wind farm 100 may have any suitable configuration, such as for example, as shown in FIG. 2. As shown, the wind turbine 102 includes a tower 114 extending from a support surface, a nacelle 116 mounted atop the tower 114, and a rotor 118 coupled to the nacelle 16. The rotor includes a rotatable hub 120 having a plurality of rotor blades 112 mounted thereon, which is, in turn, connected to a main rotor shaft that is coupled to the generator housed within the nacelle 116 (not shown). Thus, the generator produces electrical power from the rotational energy generated by the rotor 118. It should be appreciated that the wind turbine 102 of FIG. 2 is provided for illustrative purposes only. Thus, one of ordinary skill in the art should understand that the invention is not limited to any particular type of wind turbine configuration.

As shown generally in the figures, each wind turbine 102 of the wind farm 100 may also include a turbine controller 104 communicatively coupled to a farm controller 108. Moreover, in one embodiment, the farm controller 108 may be coupled to the turbine controllers 104 through a network 110 to facilitate communication between the various wind farm components. The wind turbines 102 may also include one or more sensors 105, 106, 107 configured to monitor various operating, wind, and/or loading conditions of the wind turbine 102. For instance, the one or more sensors may include blade sensors for monitoring the rotor blades 112; generator sensors for monitoring generator loads, torque, speed, acceleration and/or the power output of the generator; wind sensors 106 for monitoring the one or more wind conditions; and/or shaft sensors for measuring loads of the rotor shaft and/or the rotational speed of the rotor shaft. Additionally, the wind turbine 102 may include one or more tower sensors for measuring the loads transmitted through the tower 114 and/or the acceleration of the tower 114. In various embodiments, the sensors may be any one of or combination of the following: temperature sensors, accelerometers, pressure sensors, angle of attack sensors, vibration sensors, Miniature Inertial Measurement Units (MIMUs), camera systems, fiber optic systems, anemometers, wind vanes, Sonic Detection and Ranging (SODAR) sensors, infra lasers, Light Detecting and Ranging (LIDAR) sensors, radiometers, pitot tubes, rawinsondes, other optical sensors, virtual sensors, estimates derived from multiple sensors, and/or any other suitable sensors.

Figure 3:
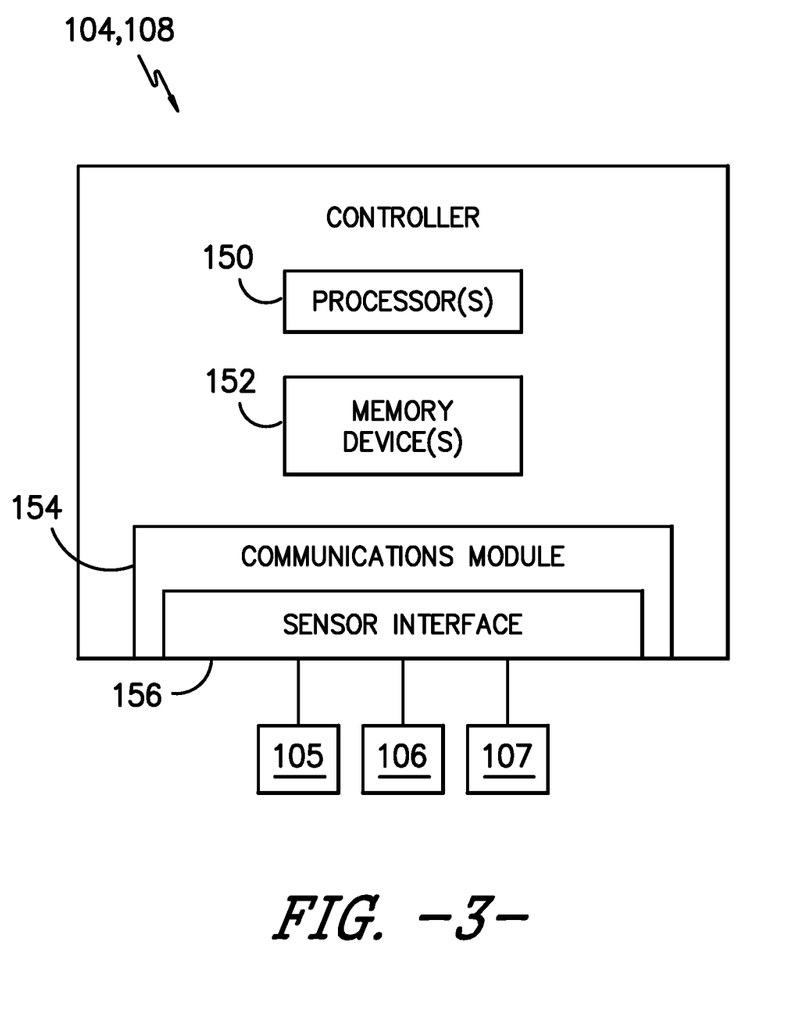
FIG. 3 illustrates a block diagram of one embodiment of a controller of a wind turbine and/or wind farm according to the present disclosure.

Referring now to FIG. 3, there is illustrated a block diagram of one embodiment of suitable components that may be included within the farm controller 108, the turbine controller(s) 104, and/or other suitable controller according to the present disclosure. As shown, the controller(s) 104, 108 may include one or more processor(s) 150 (or servers) and associated memory device(s) 152 configured to perform a variety of computer-implemented functions (e.g., performing the methods, steps, calculations and the like and storing relevant data as disclosed herein). Additionally, the controller(s) 104, 108 may also include a communications module 154 to facilitate communications between the controller(s) 104, 108 and the various components of the wind turbine 102. Further, the communications module 154 may include a sensor interface 156 (e.g., one or more analog-to-digital converters) to permit signals transmitted from one or more sensors 105, 106, 107 (such as the sensors described herein) to be converted into signals that can be understood and processed by the processors 150. It should be appreciated that the sensors 105, 106, 107 may be communicatively coupled to the communications module 154 using any suitable means. For example, as shown, the sensors 105, 106, 107 are coupled to the sensor interface 156 via a wired connection. However, in other embodiments, the sensors 105, 106, 107 may be coupled to the sensor interface 156 via a wireless connection, such as by using any suitable wireless communications protocol known in the art.

As used herein, the term "processor" refers not only to integrated circuits referred to in the art as being included in a computer, but also refers to a controller, a microcontroller, a microcomputer, a programmable logic controller (PLC), a server, an application specific integrated circuit, and other programmable circuits. Additionally, the memory device(s) 152 may generally include memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 152 may generally be configured to store suitable computer-readable instructions that, when implemented by the processor(s) 150, configure the controller(s) 104, 108 to perform various functions as described herein.

Moreover, the network 110 that couples the farm controller 108, the turbine controllers 104, and/or the wind sensors 106 in the wind farm 100 may include any known communication network such as a wired or wireless network, optical networks, and the like. In addition, the network 110 may be connected in any known topology, such as a ring, a bus, or hub, and may have any known contention resolution protocol without departing from the art. Thus, the network 110 is configured to provide data communication between the turbine controller(s) 104 and the farm controller 108 in near real time.

As generally understood, wind turbines generally include a plurality of operational analytics, which generally refer to collected and analyzed data associated with operation of the wind turbine that is or can be categorized, stored, and/or analyzed to study various trends or patterns in the data. Thus, in an embodiment, the analytic(s) described herein may include, as an example, an anomaly detection analytic that can be used to identify anomalies within operational data of the wind turbine or a group of wind turbines.

Accordingly, it is important to train such analytics on accurate data such that the analytics provide useful information. Thus, as shown in FIGS. 4 and 5, the present disclosure is directed to a method 200 and system 300 for detecting anomalies during operation of an asset to improve performance of the asset are illustrated.

Figure 4:
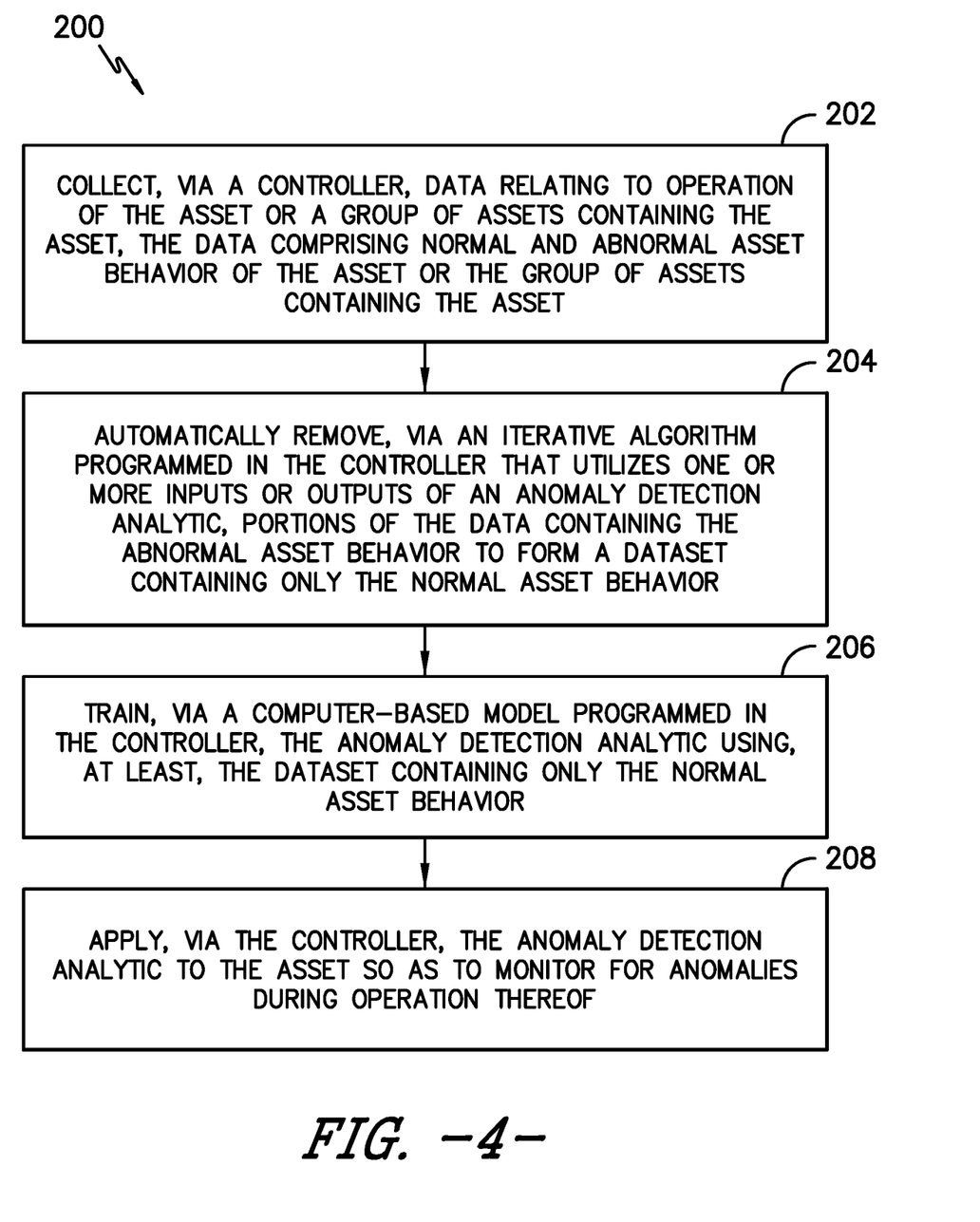
FIG. 4 illustrates a flow diagram of one embodiment of a method for detecting anomalies during operation of an asset to improve performance of the asset according to the present disclosure.
Figure 5:
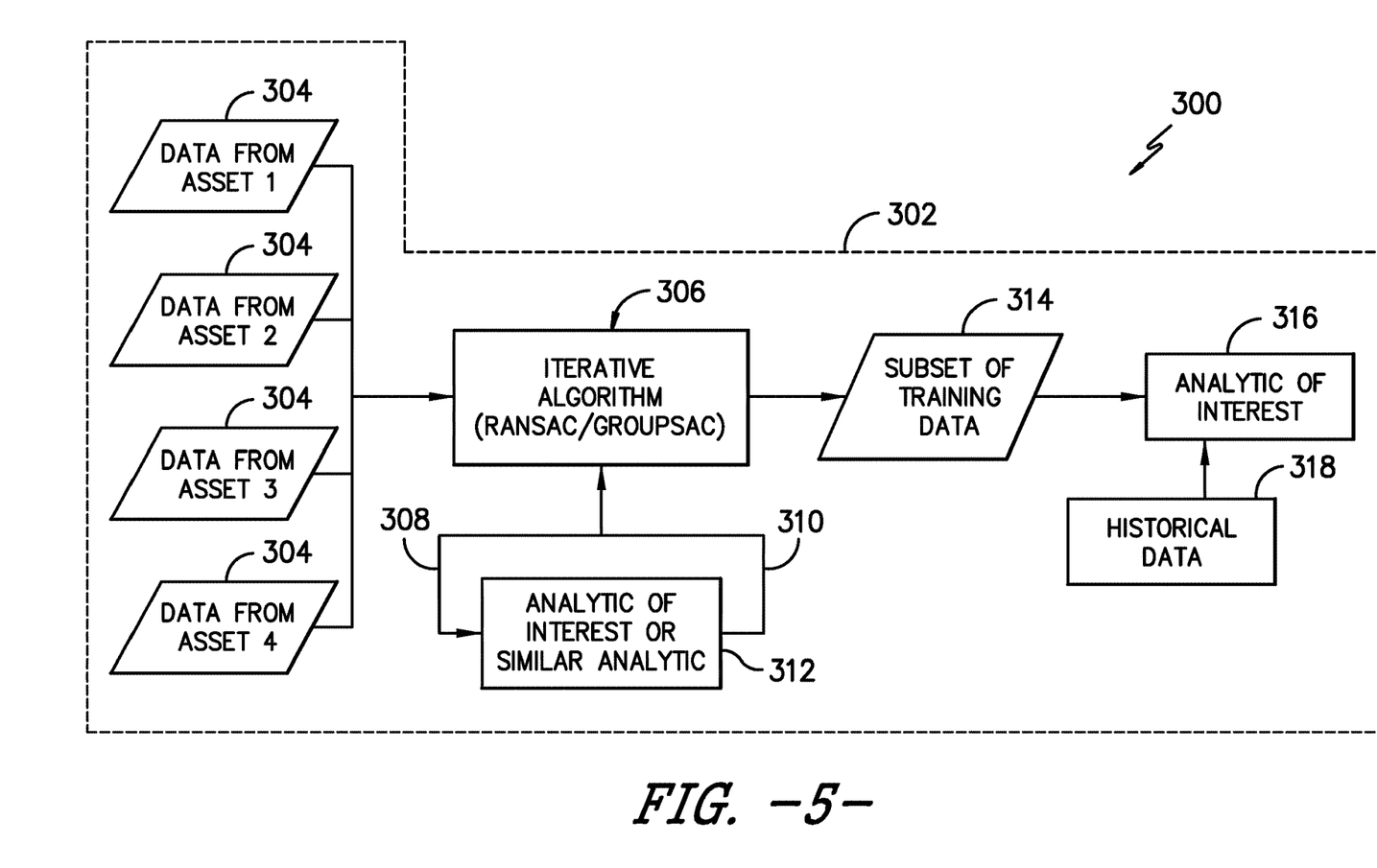
FIG. 5 illustrates a schematic diagram of one embodiment of a system for detecting anomalies during operation of an asset to improve performance of the asset according to the present disclosure.

More specifically, FIG. 4 illustrates a flow diagram of a method 200 for detecting anomalies during operation of an asset to improve performance of the asset according to the present disclosure, whereas FIG. 5 illustrates a schematic diagram of a system 300 for detecting anomalies during operation of an asset to improve performance of the asset according to the present disclosure. In general, as shown in FIG. 4, the method 200 described herein can be implemented with the wind turbine 102 and/or the wind farm 100 described above. However, it should be appreciated that the disclosed method 200 may be used with any other suitable asset having any suitable configuration. In addition, although FIG. 4 depicts steps performed in a particular order for purposes of illustration and discussion, the methods described herein are not limited to any particular order or arrangement. One skilled in the art, using the disclosures provided herein, will appreciate that various steps of the methods can be omitted, rearranged, combined and/or adapted in various ways.

As shown at (202), the method 200 includes collecting, via a server, data (such as time-series data) relating to operation of the asset or a group of assets containing the asset. For example, as shown in FIG. 5, the system 300 may include a server that is part of controller 302 (such as farm controller 104, wind turbine controller(s) 108) or the server may be a separate server or in the cloud. As such, the server collects a plurality of datasets 304 from a plurality of assets. In an embodiment, when data is collected from the groups of assets, each asset in the group may be similar in that each asset has operational data that follows similar normal data variation patterns when the assets are healthy. For example, in an embodiment, the plurality of similar assets may be the wind turbines 102 in the common wind farm 100.

In addition to wind turbines, the method 200 may be applicable to any other asset, component or device type (i.e. where multiple instances exist) that are to be monitored and are expected to behave or perform in substantially the same manner. Thus, the method 200 may be applicable to solar panels, energy storage devices or systems, engines, vehicles, trucks, and/or aircraft. Further, the method 200 may be applicable to sub-components of larger systems, such as valves, gearboxes, electrical circuits, power converters, bearings, or any other system component.

Furthermore, the collected data generally includes normal and abnormal asset behavior of the asset or the group of assets containing the asset. Further, it should be understood that the server configured to implement the method 200 may be part of the farm controller 108, part of one or more of the turbine controllers 104, and/or any other suitable controller located within the wind farm 200 or remote from the wind farm 200. In addition, in certain embodiments, the data may be collected via one or sensors.

Referring back to FIG. 4, as shown at (204), the method 200 includes automatically removing, via an iterative algorithm 306 programmed in the server that utilizes one or more inputs or outputs of the anomaly detection analytic, portions of the data containing the abnormal asset behavior to form a dataset containing only the normal asset behavior. For example, as shown in FIG. 5, the iterative algorithm 306 may include inputs 308 and outputs 310 of an analytic of interest 312. According, the iterative algorithm 306 can use the inputs 308 and outputs 310 to determine a subset of training data 314 as further described herein below. In an embodiment, the anomaly detection analytic(s) may include at least one of a similarity-based modeling (SBM) based anomaly detection analytic.

In addition, in an embodiment, the iterative algorithm 306 may include a random sample consensus (RANSAC) algorithm. In such embodiments, the RANSAC algorithm is configured to automatically remove the portions of the data containing the abnormal asset behavior to form the dataset containing only the normal asset behavior. More specifically, in one embodiment, the RANSAC algorithm may first randomly sample the data relating to operation of the asset or the group of assets containing the asset. Further, the RANSAC algorithm can then train a model of the anomaly detection analytic using the sampled data and evaluate the model using unsampled portions of the data. Moreover, the RANSAC algorithm can count a number of inliers within the evaluated model. As used herein, inliers generally correspond to data points conforming to the model. The algorithm can then repeat these steps until the inliers within the model exceed a certain threshold. Once the number of inliers is satisfactory (i.e. when the inliers within the model exceed the certain threshold), the RANSAC algorithm outputs a training dataset to the anomaly detection analytic(s). Accordingly, the training dataset contains only data representative of the normal asset behavior.

In another embodiment, the random sample consensus algorithm may include a group-based random sample consensus algorithm. In such embodiments, the algorithm is configured to remove the portions of the data containing the abnormal asset behavior by dividing the data relating to operation of the asset or the group of assets into multiple subsets and randomly sampling a collection of the multiple subsets. This is done in such a way to increase the likelihood that the multiple subsets will contain data corresponding predominantly to normal operation of the assets. For example, in an embodiment, the grouped-based random sample consensus algorithm is configured to determine the multiple subsets using a predetermined permutation of the data or a ranking of the subsets. In such embodiments, as an example, the ranking of the subsets may be at least one of a distance between assets, installation date, service history of the asset or the group of assets, or operating history of the asset or the group of assets. The group-based random sample consensus algorithm herein is similar to the Group Sample Consensus algorithm (GroupSAC) in that the nonuniformity of inliers in the data are utilized.

Then, similarly to the RANSAC algorithm, the grouped-based random sample consensus algorithm can train the model of the anomaly detection analytic using the sampled collection of the multiple subsets and can evaluate the model using the data outside of the collection. Further, the grouped-based random sample consensus algorithm is configured to count a number of inliers within the evaluated model, the inliers corresponding to data points conforming to the model, or alternatively counting the number of subsets that the inliers belong to. Accordingly, the grouped-based random sample consensus algorithm continues to repeat the process until the number of inliers within the model or the number of subsets that the inliers belong to exceed a certain threshold. Further, the grouped-based random sample consensus algorithm outputs a trained dataset to the anomaly detection analytic(s) when the inliers within the model exceed the certain threshold such that the trained dataset contains only data representative of the normal asset behavior.

Referring back to FIG. 4, as shown at (206), the method 200 includes training, via a computer-based model programmed in the server, the analytic using, at least, the dataset containing only the normal asset behavior. For example, as shown in FIG. 5, the system 300 may train anomaly detection analytic(s) 316 (i.e. or any anomaly of interest) using the dataset 314 containing only the normal asset behavior. In further embodiments, as shown, the system 300 may also train the analytic(s) using historical data 318 of the asset.

Furthermore, in an embodiment, the computer-based model used to train the analytic 316 may include at least one of a machine learning algorithm or a statistical model. It should be understood that any suitable machine learning algorithm or statistical model may be used to train the analytic(s) described herein. For example, in an embodiment, stepwise linear regression may be utilized to train the analytic(s). Generally, stepwise linear regression adds or removes features one at a time in an attempt to get the best regression model without over fitting. Further, stepwise regression typically has two variants, including forward and backward regression, both of which are within the scope and spirit of the invention. For example, forward stepwise regression is a step-by-step process of building a model by successive addition of predictor variables. At each step, models with and without a potential predictor variable are compared, and the larger model is accepted only if it leads to a significantly better fit to the data. Alternatively, backward stepwise regression starts with a model with all predictors and removes terms that are not statistically significant in terms of modeling a response variable.

Another statistical method that may be used to train the analytic(s) may be an absolute shrinkage and selection operator (LASSO) algorithm. Generally, a LASSO algorithm minimizes the residual sum of squares subject to a constraint that the sum of the absolute value of the coefficients is smaller than a constant. Still another statistical algorithm that may be used to train the analytic(s) is a M5 Prime (M5P) algorithm, which is a tree-based regression algorithm that is effective in many domains. For example, whereas stepwise linear regression produces a single global linear model for the data, tree based regression algorithms perform logical tests on features to form a tree structure. Generally, the M5P algorithm utilizes a linear regression model at each node of the tree, providing more specialized models.

As mentioned, a machine learning model may also be used to train the analytic(s), such as Gaussian Process Models, Random Forest Models, and/or Support Vector Machines. The model implementation may be used directly or via a micro-service. For example, in an embodiment, the analytic(s) may be trained by using annotated analytic outputs relating to the operation of the wind turbine(s) 102. More specifically, a human annotator can classify the received data for use by the machine learning model. Annotation (e.g. annotated analytics) in machine learning generally refers to a process of labelling data in a manner that can be recognized by machines or computers. Furthermore, such annotation can be completed manually by humans as human annotators generally better interpret subjectivity, intent, and ambiguity within the data. Thus, machines can learn from the annotated data by recognizing the human annotations over time. In some cases, annotation can be learned by artificial intelligence and/or other algorithms, such as semi-supervised learning or clustering, as well as any other suitable accurate labeling process. The annotated data can then be fed into the analytics(s) for training and/or correcting.

In other words, the controller(s) described herein may include a supervised machine learning algorithm that can apply what has been learned in the past to new data using labeled data to predict future performance or operation of the asset(s). Starting from the model build, the learning algorithm produces an inferred function to make predictions about the output values. As such, the controller(s) is able to provide targets for any new input after sufficient training. The learning algorithm can also compare its output with the correct, intended output and find errors in order to modify the model accordingly.

Referring still to FIG. 4, as shown at (208), once the analytic(s) has been properly trained, the method 200 includes applying, via the server, the anomaly detection analytic to the asset so as to monitor for anomalies during operation thereof. In other words, the anomaly detection analytic collects data relating to operation of the asset with the outputs thereof having improved performance due to the analytic being trained on data the represents healthy operation.

Figure 6:
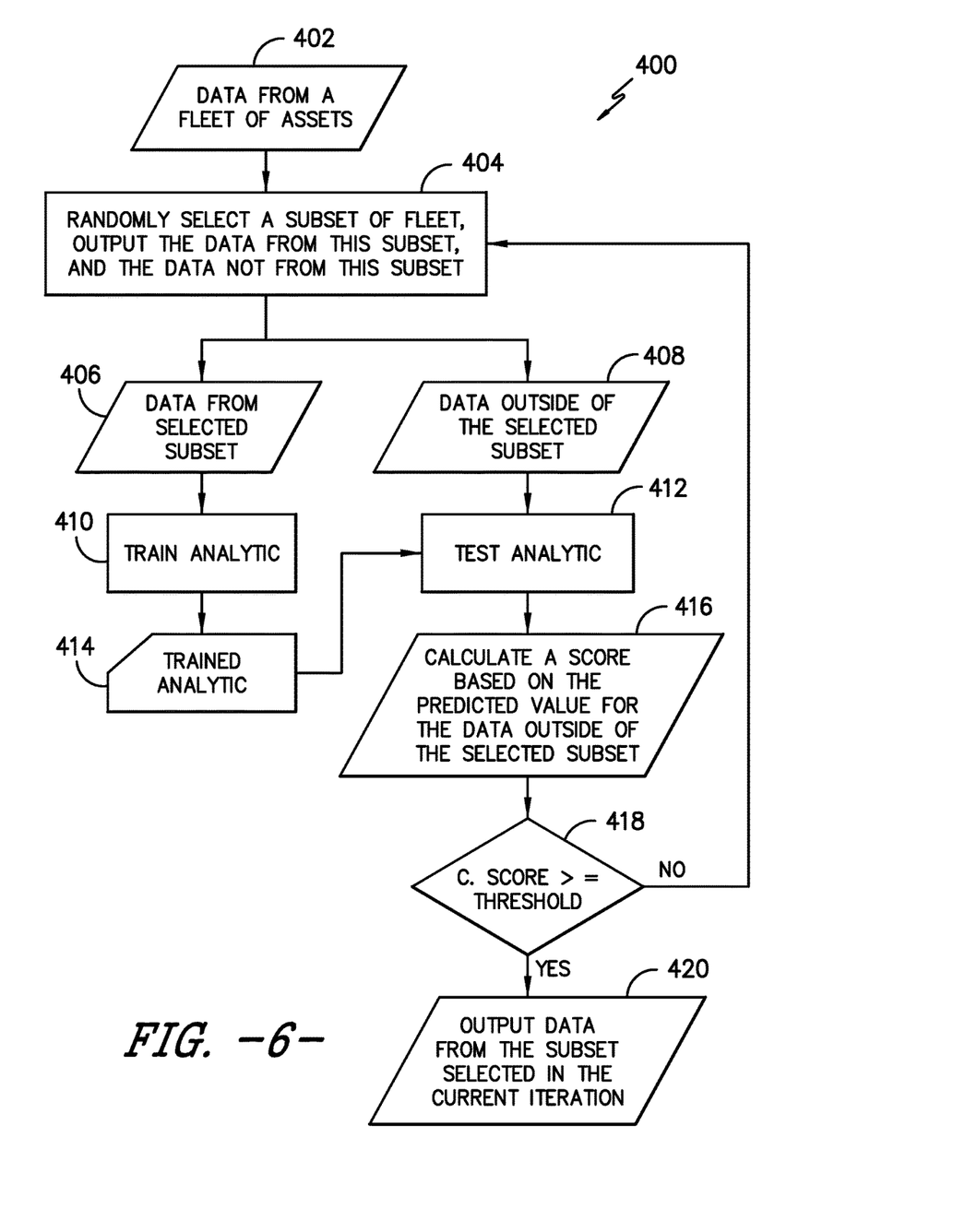
FIG. 6 illustrates a flow chart of another embodiment of a system for detecting anomalies during operation of an asset to improve performance of the asset according to the present disclosure.

Referring now to FIG. 6, a flow chart of another embodiment of a system 400 for detecting anomalies during operation of an asset to improve performance of the asset according to the present disclosure is illustrated. As shown at 402, data is collected from a fleet of assets. As shown at 404, a fleet consensus module 404 randomly selects a subset of assets in the fleet. As shown at 406 and 410, the system 400 sends data from the selected subset to the analytic for training. Thus, the analytic trains itself on the selected data from 406. As shown at 408 and 412, data outside of the selected subset is sent to the analytic for testing. As shown at 416, the trained analytic 414 and the test analytic 412 are then used to calculate a score based on the predicted value for the data outside of the selected subset 408. This process can be repeated until the score reaches a certain threshold. For example, as shown at 418, the score can be compared to the threshold. If above the threshold, as shown at 420, the system 400 outputs the data from the subset selected in the current iteration. If not above the threshold, the system will restart at 404. The number of allowed restarts may be limited. After all allowed restarts are exhausted the system may output the data subset corresponding to the greatest score calculated in 416. The system may force a certain number of restarts at 404 in order to achieve a large score. Accordingly, the final set of selected data is outputted to be used by the analytic during operation of the asset.

In certain embodiments, the score may correspond to the number of test data points that fits the trained analytic model, or a weighted count. In addition, in an embodiment, the score may be the accuracy of the analytic. In still further embodiments, in place of one score, multiple scores may be used.

Moreover, the threshold(s) described herein may be constant or may vary. For example, the threshold(s) may depend on the number of iterations, the size of the subset or the entire data set, and/or previous scores. In another embodiment, the comparison may be restricted to a thresholding decision. For example, in an embodiment, the thresholding decision may a decision region, which could be combinations of multiple intervals when there is one score, or a union of boxes when there are multiple scores.

In still further embodiments, instead of simply outputting the data from the selected subsets, other data that depends on the subset selection or the trained analytic may also be used. For example, all data points that fit the trained model could be output instead.

Various aspects and embodiments of the present invention are defined by the following numbered clauses:

Clause 1. A method for detecting anomalies during operation of an asset to improve performance of the asset, the method comprising:

collecting, via a server, data relating to operation of the asset or a group of assets containing the asset, the data comprising normal and abnormal asset behavior of the asset or the group of assets containing the asset;

automatically removing, via an iterative algorithm programmed in the server that utilizes one or more inputs or outputs of an anomaly detection analytic, portions of the data containing the abnormal asset behavior to form a dataset containing only the normal asset behavior;

training, via a computer-based model programmed in the server, the anomaly detection analytic using, at least, the dataset containing only the normal asset behavior; and, applying, via the server, the anomaly detection analytic to the asset so as to monitor for anomalies during operation thereof.

Clause 2. The method of clause 1, wherein each asset in the group of assets comprises operational data that follows similar normal data variation patterns when the assets are healthy.

Clause 3. The method of clause 2, wherein the plurality of similar assets comprise at least one of a plurality of wind turbines in a wind farm, a plurality of solar panels in a solar farm, a plurality of energy storage systems, or combinations thereof.

Clause 4. The method of any of the preceding clauses, wherein the iterative algorithm comprises a random sample consensus algorithm.

Clause 5. The method of any of the preceding clauses, wherein automatically removing, via the random sample consensus algorithm programmed in the server, the portions of the data containing the abnormal asset behavior to form the dataset containing only the normal asset behavior further comprises:

(a) randomly sampling the data relating to operation of the asset or the group of assets containing the asset;

(b) training a model of the anomaly detection analytic using the sampled data;

(c) evaluating the model using unsampled portions of the data;

(d) counting a number of inliers within the evaluated model, the inliers corresponding to data points confirming to the model;

(e) repeating (a) through (d) until the inliers within the model exceed a certain threshold; and (f) outputting a trained dataset to the at least one anomaly detection analytic when the inliers within the model exceed the certain threshold, the trained dataset containing only data representative of the normal asset behavior.

Clause 6. The method of any of the preceding clauses, wherein the random sample consensus algorithm comprises a group-based random sample consensus algorithm.

Clause 7. The method of any of the preceding clauses, wherein automatically removing, via the group-based random sample consensus algorithm programmed in the server, the portions of the data containing the abnormal asset behavior to form the dataset containing only the normal asset behavior comprises:

(a) dividing the data relating to operation of the asset or the group of assets into multiple subsets;

(b) randomly sampling a collection of the multiple subsets;

(c) training a model of the anomaly detection analytic using the sampled collection of the multiple subsets;

(d) evaluating the model using the data outside of the collection;

(e) counting a number of inliers within the evaluated model, the inliers corresponding to data points conforming to the model, or alternatively counting the number of subsets that the inliers belong to;

(f) repeating (b) through (e) until the number of inliers within the model or the number of subsets that the inliers belong to exceed a certain threshold; and (g) outputting a trained dataset to the at least one anomaly detection analytic when the inliers within the model exceed the certain threshold, the trained dataset containing only data representative of the normal asset behavior.

Clause 8. The method of any of the preceding clauses, further comprising dividing the data into the multiple subsets based on which assets the data is collected from, whether each subset contains data from one asset or multiple assets, or multiple assets grouped by a distance between assets, installation date, configuration of the assets, service or operating history of the assets, or operating states of the assets.

Clause 9. The method of any of the preceding clauses, wherein the data relating to operation of the asset or the group of assets containing the asset comprises time-series data.

Clause 10. The method of any of the preceding clauses, further comprising training the at least one anomaly detection analytic using the dataset containing only the normal asset behavior and historical data.

Clause 11. The method of any of the preceding clauses, wherein the at least one anomaly detection analytic comprises at least one of a similarity-based modeling (SBM) based anomaly detection analytic.

Clause 12. The method of any of the preceding clauses, wherein the computer-based model comprises at least one of a machine learning algorithm or a statistical model.

Clause 13. A system for improving performance of at least one asset, the system comprising:

at least one analytic for receiving an analytic input and generating an analytic output relating to operation of the asset or a group of assets containing the asset;

a server communicatively coupled to the at least one analytic, the server configured to perform a plurality of operations, the plurality of operations comprising: collecting data relating to operation of the asset or the group of assets containing the asset, the data comprising normal and abnormal asset behavior of the asset or the group of assets containing the asset;

automatically removing, via an iterative algorithm programmed in the server that utilizes one or more of the analytic input or analytic output, portions of the data containing the abnormal asset behavior to form a dataset containing only the normal asset behavior;

training, via a computer-based model programmed in the server, the at least one analytic using, at least, the dataset containing only the normal asset behavior; and, applying, via the server, the analytic to the asset to improve the performance of the asset.

Clause 14. The system of clause 13, wherein the at least one asset comprises at least one of a wind turbine, a solar panel, an energy storage system, or combinations thereof.

Clause 15. The system of clauses 13-14, wherein the iterative algorithm comprises a random sample consensus algorithm.

Clause 16. The system of clauses 13-15, wherein automatically removing, via the random sample consensus algorithm programmed in the server, the portions of the data containing the abnormal asset behavior to form the dataset containing only the normal asset behavior further comprises:

(a) randomly sampling the data relating to operation of the asset or the group of assets containing the asset;

(b) training a model of the anomaly detection analytic using the sampled data;

(c) evaluating the model using unsampled portions of the data;

(d) counting a number of inliers within the evaluated model, the inliers corresponding to data points confirming to the model;

(e) repeating (a) through (d) until the inliers within the model exceed a certain threshold; and (f) outputting a trained dataset to the at least one anomaly detection analytic when the inliers within the model exceed the certain threshold, the trained dataset containing only data representative of the normal asset behavior.

Clause 17. The system of clauses 13-16, wherein the random sample consensus algorithm comprises a group-based random sample consensus.

Clause 18. The system of clauses 13-17, wherein automatically removing, via the group-based random sample consensus algorithm programmed in the server, the portions of the data containing the abnormal asset behavior to form the dataset containing only the normal asset behavior comprises:

(a) dividing the data relating to operation of the asset or the group of assets into multiple subsets;

(b) randomly sampling a collection of the multiple subsets;

(c) training a model of the anomaly detection analytic using the sampled collection of the multiple subsets;

(d) evaluating the model using the data outside of the collection;

(e) counting a number of inliers within the evaluated model, the inliers corresponding to data points conforming to the model, or alternatively counting the number of subsets that the inliers belong to;

(f) repeating (b) through (e) until the number of inliers within the model or the number of subsets that the inliers belong to exceed a certain threshold; and (g) outputting a trained dataset to the at least one anomaly detection analytic when the inliers within the model exceed the certain threshold, the trained dataset containing only data representative of the normal asset behavior.

Clause 19. The system of clauses 13-18, further comprising dividing the data into the multiple subsets based on which assets the data is collected from, whether each subset contains data from one asset or multiple assets, or multiple assets grouped by a distance between assets, installation date, configuration of the assets, service or operating history of the assets, or operating states of the assets.

Clause 20. The system of clauses 13-19, wherein the computer-based model comprises at least one of a machine learning algorithm or a statistical model, and wherein the analytic comprises an anomaly detection analytic.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for detecting anomalies during operation of an asset to improve performance of the asset, the method comprising:

collecting, via a server, data relating to operation of the asset or a group of assets containing the asset, the data comprising normal and abnormal asset behavior of the asset or the group of assets containing the asset;

automatically removing, via an iterative algorithm programmed in the server that utilizes one or more inputs or outputs of an anomaly detection analytic, portions of the data containing the abnormal asset behavior to form a dataset containing only the normal asset behavior, wherein the iterative algorithm comprises a random sample consensus algorithm, and wherein the automatically removing comprises:

(a) randomly sampling the data relating to operation of the asset or the group of assets containing the asset;

(b) training a model of the anomaly detection analytic using the sampled data;

(c) evaluating the model using unsampled portions of the data;

(d) counting a number of inliers within the evaluated model, the inliers corresponding to data points confirming to the model;

(e) repeating (a) through (d) until the inliers within the model exceed a certain threshold; and (f) outputting a trained dataset to the at least one anomaly detection analytic when the inliers within the model exceed the certain threshold, the trained dataset containing only data representative of the normal asset behavior;

training, via a computer-based model programmed in the server, the anomaly detection analytic using, at least, the dataset containing only the normal asset behavior; and, applying, via the server, the anomaly detection analytic to the asset so as to monitor for anomalies during operation thereof.

2. The method of claim 1, wherein each asset in the group of assets comprises operational data that follows similar normal data variation patterns when the assets are healthy.

3. The method of claim 2, wherein the plurality of similar assets comprise at least one of a plurality of wind turbines in a wind farm, a plurality of solar panels in a solar farm, a plurality of energy storage systems, or combinations thereof.

4. The method of claim 1, wherein the random sample consensus algorithm comprises a group-based random sample consensus algorithm.

5. The method of claim 4, wherein automatically removing, via the group-based random sample consensus algorithm programmed in the server, the portions of the data containing the abnormal asset behavior to form the dataset containing only the normal asset behavior comprises:

(a) dividing the data relating to operation of the asset or the group of assets into multiple subsets;

(b) randomly sampling a collection of the multiple subsets;

(c) training a model of the anomaly detection analytic using the sampled collection of the multiple subsets;

(d) evaluating the model using the data outside of the collection;

(e) counting a number of inliers within the evaluated model, the inliers corresponding to data points conforming to the model, or alternatively counting the number of subsets that the inliers belong to;

(f) repeating (b) through (e) until the number of inliers within the model or the number of subsets that the inliers belong to exceed a certain threshold; and (g) outputting a trained dataset to the at least one anomaly detection analytic when the inliers within the model exceed the certain threshold, the trained dataset containing only data representative of the normal asset behavior.

6. The method of claim 1, further comprising dividing the data into the multiple subsets based on which assets the data is collected from, whether each subset contains data from one asset or multiple assets, or multiple assets grouped by a distance between assets, installation date, configuration of the assets, service or operating history of the assets, or operating states of the assets.

7. The method of claim 1, wherein the data relating to operation of the asset or the group of assets containing the asset comprises time-series data.

8. The method of claim 1, further comprising training the at least one anomaly detection analytic using the dataset containing only the normal asset behavior and historical data.

9. The method of claim 1, wherein the at least one anomaly detection analytic comprises at least one of a similarity-based modeling (SBM) based anomaly detection analytic.

10. The method of claim 1, wherein the computer-based model comprises at least one of a machine learning algorithm or a statistical model.

11. A system for improving performance of at least one asset, the system comprising:
at least one analytic for receiving an analytic input and generating an analytic output relating to operation of the asset or a group of assets containing the asset;
a server communicatively coupled to the at least one analytic, the server configured to perform a plurality of operations, the plurality of operations comprising:
collecting data relating to operation of the asset or the group of assets containing the asset, the data comprising normal and abnormal asset behavior of the asset or the group of assets containing the asset;
automatically removing, via an iterative algorithm programmed in the server that utilizes one or more of the analytic input or analytic output, portions of the data containing the abnormal asset behavior to form a dataset containing only the normal asset behavior, wherein the iterative algorithm comprises a random sample consensus algorithm, and wherein the automatically removing comprises:
(a) randomly sampling the data relating to operation of the asset or the group of assets containing the asset;
(b) training a model of the anomaly detection analytic using the sampled data;

(c) evaluating the model using unsampled portions of the data;

(d) counting a number of inliers within the evaluated model, the inliers corresponding to data points confirming to the model;

(e) repeating (a) through (d) until the inliers within the model exceed a certain threshold; and (f) outputting a trained dataset to the at least one anomaly detection analytic when the inliers within the model exceed the certain threshold, the trained dataset containing only data representative of the normal asset behavior;

training, via a computer-based model programmed in the server, the at least one analytic using, at least, the dataset containing only the normal asset behavior; and, applying, via the server, the analytic to the asset to improve the performance of the asset.

12. The system of claim 11, wherein the at least one asset comprises at least one of a wind turbine, a solar panel, an energy storage system, or combinations thereof.

13. The system of claim 11, wherein the random sample consensus algorithm comprises a group-based random sample consensus.

14. The system of claim 13, wherein automatically removing, via the group-based random sample consensus algorithm programmed in the server, the portions of the data containing the abnormal asset behavior to form the dataset containing only the normal asset behavior comprises:

(a) dividing the data relating to operation of the asset or the group of assets into multiple subsets;

(b) randomly sampling a collection of the multiple subsets;

(c) training a model of the anomaly detection analytic using the sampled collection of the multiple subsets;

(d) evaluating the model using the data outside of the collection;

(e) counting a number of inliers within the evaluated model, the inliers corresponding to data points conforming to the model, or alternatively counting the number of subsets that the inliers belong to;

(f) repeating (b) through (e) until the number of inliers within the model or the number of subsets that the inliers belong to exceed a certain threshold; and (g) outputting a trained dataset to the at least one anomaly detection analytic when the inliers within the model exceed the certain threshold, the trained dataset containing only data representative of the normal asset behavior.

15. The system of claim 14, further comprising dividing the data into the multiple subsets based on which assets the data is collected from, whether each subset contains data from one asset or multiple assets, or multiple assets grouped by a distance between assets, installation date, configuration of the assets, service or operating history of the assets, or operating states of the assets.

16. The system of claim 11, wherein the computer-based model comprises at least one of a machine learning algorithm or a statistical model, and wherein the analytic comprises an anomaly detection analytic.

\* \* \* \* \*